A. G. Slagle,
No. 88,421. Game. Patented Mar. 30, 1869.
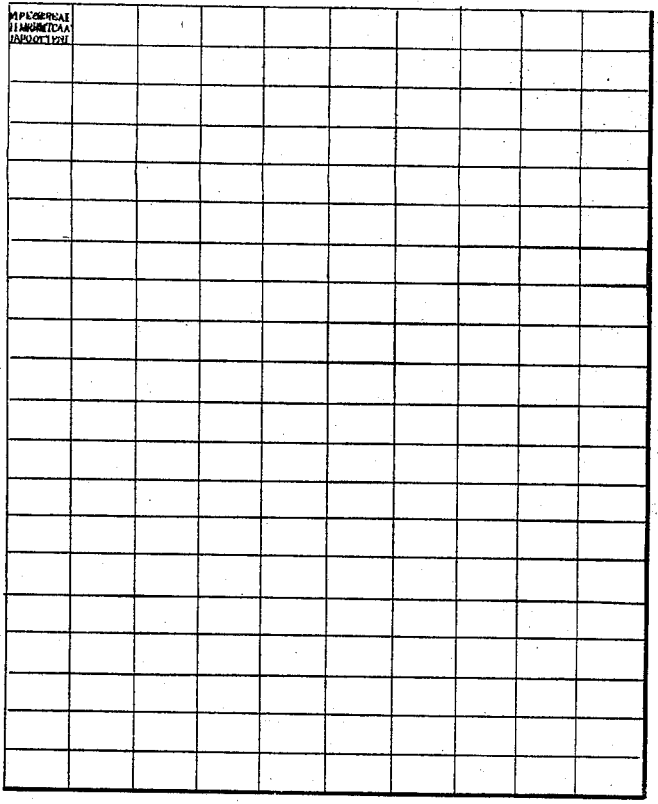
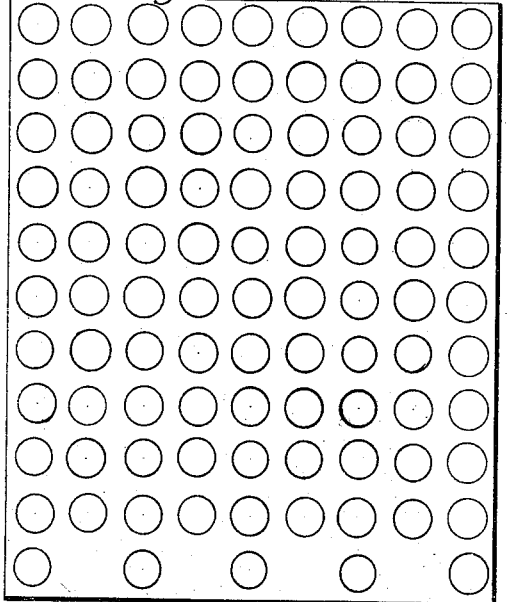
Fig. 1. Fig. 2. Fig. 3. Fig. 4. Fig. 5.
Witnesses:
Inventor:
A. G. Slagle

United States Patent Office.

ALEXANDER G. SLAGLE, OF MEMPHIS, TENNESSEE.

Letters Patent No. 88,421, dated March 30, 1869.

GAME.

The Schedule referred to in these Letters Patent and making part of the same.

*To all whom it may concern:*

Be it known that I, ALEXANDER G. SLAGLE, of Memphis, in the county of Shelby, and State of Tennessee, have invented a new and useful Game, which I denominate "190;" and I do hereby declare that the following is a full, clear, and exact description thereof, reference being had to the accompanying drawings, making part of this specification, in which—

Figure 1 is a view of a bag, which is adapted for containing balls used in playing the game, and allowing these balls to be mixed and drawn singly.

Figure 2 shows five of the balls used in playing.

Figure 3 shows a chart for keeping account of the game.

Figures 4 represent three of the lettered cards used in playing.

Figure 5 is a view of a correcting-board.

This invention relates to a new and interesting game, which I shall denominate "The Game of 190."

It consists essentially of one hundred and ninety cards, numbered consecutively from 1 to 190, and having suitably printed upon their faces, certain combinations of letters, divided by horizontal and vertical lines, so as to form twenty-seven squares, arranged in three parallel rows, containing nine squares in each row.

I take, say, ten letters of the alphabet, and make all the combinations possible with these ten letters.

The first vertical row of squares on every card contains but one letter; the others rows contain double letters, arranged promiscuously, as represented in figs. 4, so that there shall not be, in the whole pack of one hundred and ninety cards, two cards alike, nor two horizontal lines of combinations alike on any two cards.

I have found that the greatest number of combinations of letters obtained from the use of ten letters of the alphabet, will, when disposed five in a row on each card, require one hundred and ninety cards; hence this title I deem the most suitable for the game.

I employ ninety balls, which may be made of wood, ivory, or any other suitable material, each one of which has one or two letters printed or engraved upon it, and no two balls contain the same combination.

Each ball has one or two letters upon it, corresponding to a similar single or double letter found upon the cards.

Ninety balls exhaust the combination of letters used, and one hundred and ninety cards exhaust the combination and arrangement of the letters used.

I also employ what I denominate a chart, for the purpose of pegging off, or indicating the numbers of the cards which may have been drawn from the pack, or pile.

This chart is divided into one hundred and ninety squares, by means of horizontal and vertical lines. Each square is numbered, and has printed upon it a combination and arrangement of letters corresponding to the combination and arrangement of letters upon a similarly-numbered card in the pack, or pile.

For conveniently using the chart, it may be pasted upon a card-board, or upon a wooden board; and just over each one of the numbers in the squares, a hole is made for receiving a peg, or pin.

I furthermore employ a board having ninety depressions, or cups in it, arranged in ten regular rows, of nine each, corresponding to the number of balls used, and adapted for receiving these balls during the progress of the game.

There are also five cups, or depressions in said board, as shown in fig. 5, which are used for receiving the balls as the letters are called off from the cards by the player. This row I term the correcting-row.

Any number of persons less than one hundred and ninety can play the game.

The ninety balls are put into the bag, and well shaken. The players then draw from the pack, or pile of cards, one, two, three, or more cards, as may be required, and each person calls out the numbers which are upon his cards, which numbers are indicated upon the chart by inserting pegs in their appropriate places.

The Game.

The person holding the bag of balls, draws from the bag one ball, and calls out the letter or letters upon it, and if such letter or letters can be found by a person holding a card, he answers the letters called out, and puts a button upon such letter or letters. As the balls are drawn from the bag, and their letters called out, the person or persons, as the case may be, continues to cover the corresponding letters upon their cards, until a certain predetermined number of balls is drawn.

The game consists in getting five combinations of letters in a horizontal row covered, and when a person is thus successful, he should indicate it by calling out the fact.

As the person holding the bag successively draws therefrom the balls, he places them in their respective cups, in the correcting-board, and as the single or double letter of each ball is called out that corresponds to a similar single or double letter on the chart, the same is checked, or pegged upon this chart, to prevent confusion or mistakes in playing.

When a person calls game, that is, when he has covered one row, he calls out his combination, and if it agrees with the balls drawn from the bag, and also with the row of letters which have been pegged upon the chart, he is declared first out, and the game may thus continue until all the players get out in the same manner, or the play may commence anew by the players drawing other cards from the pack, or pile, or preserving the same cards as before drawn.

The game will become very exciting when one or more of the players has covered four combinations in a horizontal row, as he then has but one more combination to cover to give him the game.

Having described my invention,

What I claim as new, and desire to secure by Letters Patent, is—

A game, which is composed of a combination of letters and numbers disposed upon cards, balls, and a chart, or register, and played substantially as herein described.

A. G. SLAGLE.

Witnesses:
JULIUS HIRSCH,
J. N. CAMPBELL.